(12) United States Patent
Mukaida (10) Patent No.: US 8,316,208 B2
(45) Date of Patent: Nov. 20, 2012

(54) MEMORY CONTROLLER, FLASH MEMORY SYSTEM WITH MEMORY CONTROLLER, AND METHOD OF CONTROLLING FLASH MEMORY

(75) Inventor: Naoki Mukaida, Tokyo (JP)

(73) Assignee: TDK Corporation, Tokyo (JP)

( * ) Notice: Subject to any disclaimer, the term of this patent is extended or adjusted under 35 U.S.C. 154(b) by 345 days.

(21) Appl. No.: 12/820,200

(22) Filed: Jun. 22, 2010

(65) Prior Publication Data

US 2011/0283052 A1  Nov. 17, 2011

(30) Foreign Application Priority Data

May 14, 2010  (JP) .................................. 2010-111786

(51) Int. Cl.
*G06F 12/02* (2006.01)

(52) U.S. Cl. .......................... 711/202; 711/103; 711/209

(58) Field of Classification Search ........................ None
See application file for complete search history.

(56) References Cited

U.S. PATENT DOCUMENTS

| | | | |
|---|---|---|---|
| 7,617,352 B2 | 11/2009 | Mukaida et al. | |
| 2001/0012222 A1 | 8/2001 | Terasaki | |
| 2004/0128436 A1* | 7/2004 | Regev et al. | 711/108 |
| 2009/0307525 A1* | 12/2009 | Hiratsuka et al. | 714/8 |
| 2010/0095054 A1 | 4/2010 | Terasaki | |
| 2010/0205356 A1* | 8/2010 | Mukaida et al. | 711/103 |

FOREIGN PATENT DOCUMENTS

| | | |
|---|---|---|
| JP | 2001-243110 A | 9/2001 |
| JP | A-2002-196977 | 7/2002 |
| JP | A-2002-358233 | 12/2002 |
| JP | 2007323138 A | 12/2007 |
| JP | A-2009-181254 | 8/2009 |
| JP | A-2010-97333 | 4/2010 |
| WO | WO 02/052416 | 7/2002 |

OTHER PUBLICATIONS

Office Action dated Dec. 12, 2011 in corresponding JP Application No. 2010-111786.
Office Action dated May 23, 2012 in corresponding JP application No. 2010-111786.

* cited by examiner

*Primary Examiner* — Than Nguyen
(74) *Attorney, Agent, or Firm* — Posz Law Group, PLC

(57) ABSTRACT

The object of the present invention is to efficiently perform access to a physical block corresponding to a logical block often designated by an access request. To realize it, predetermined number of pieces of logical block information each for access to a physical block corresponding to logical block, until then, designated by an access request is held. In holding the predetermined pieces of logical block information, a piece of logical block information having high priority precede a piece of logical block information having low priority in priority order. In management of the priority order, priority of a piece of logical block information corresponding to a logical block often designated by an access request becomes high. When an access request is received, if logical block information corresponding to the logical block designated by the access request is held, access to the physical block corresponding to the designated logical block is performed based on the held logical block information.

6 Claims, 8 Drawing Sheets

| | LBN | PBA | PP |
|---|---|---|---|
| #0 | #1 | #17 | #36 |
| #1 | #35 | #78 | #27 |
| #2 | #524 | | |
| | . | . | . |
| | . | . | . |
| | . | . | . |
| #29 | #128 | #725 | #63 |
| #30 | #335 | #438 | #22 |
| #31 | #473 | #222 | #17 |

| LBN | PBA |
|---|---|
| #0 | #1 |
| #1 | #17 |
| #2 | #18 |
| #3 | #3 |
| #4 | #11 |
| #5 | #12 |
| #6 | #6 |
| #7 | #21 |
| #8 | #15 |
| . | . |
| . | . |
| . | . |
| #992 | #1001 |
| #993 | #976 |
| #994 | #1005 |
| #995 | #978 |
| #996 | #979 |
| #997 | #1010 |
| #998 | #999 |
| #999 | #1017 |

|     | LBN | PBA | PP |
|-----|-----|-----|-----|
| #0  | #1  | #17 | #36 |
| #1  | #35 | #78 | #27 |
| #2  | #524 |    |     |
|     | . | . | . |
|     | . | . | . |
|     | . | . | . |
| #29 | #128 | #725 | #63 |
| #30 | #335 | #438 | #22 |
| #31 | #473 | #222 | #17 |

| LPN | PPN |
|---|---|
| #0 | #0 |
| #1 | #1 |
| #2 | #2 |
| #3 | #3 |
| #4 | #4 |
| #5 | #5 |
| #6 | #31 |
| #7 | #32 |
| #8 | #33 |
| ... | ... |
| #56 | #60 |
| #57 | |
| #58 | |
| #59 | |
| #60 | |
| #61 | |
| #62 | |
| #63 | |

MEMORY CONTROLLER, FLASH MEMORY SYSTEM WITH MEMORY CONTROLLER, AND METHOD OF CONTROLLING FLASH MEMORY

CROSS-REFERENCE TO PRIOR APPLICATION

This application relates to and claims the benefit of priority from Japanese Patent Application number 2010-111786, filed on May 14, 2010, the entire disclosure of which is incorporated herein by reference.

BACKGROUND

The present invention generally relates to a memory controller for a flash memory, a memory system having the memory controller, and a method of controlling the flash memory.

In a memory system employing a flash memory, the relationship between logical addresses provided from a host system and physical addresses in the flash memory is typically managed in logical blocks. Each logical block is composed of plural logical sectors. Each logical address is assigned to each logical sector. Each logical block is assigned to a prescribed number of physical blocks (one or more physical blocks), each of which is an erasing unit, in the flash memory. Each physical block is composed of plural physical pages, each of which is a writing unit and also a reading unit.

Data writing to physical pages in a physical block must be executed in ascending order of their page numbers. Therefore, when writing data to a physical block, the physical page having the smallest page number among free physical pages in the physical block is identified, and then data writing is executed from the physical page having the smallest page number in the ascending order.

For example, the relationship between logical blocks and physical blocks is managed on a basis of an address translation table, as shown in Reference 1 (JP-A-2001-243110). Further, according to Reference 1, in view of efficiency of access to the flash memory and management of the address translation tables, the tables are made up in logical zones each composed of plural logical blocks, and some of the tables are hold in a SRAM (Static Random Access Memory).

Also, a physical page having the smallest page number among free physical pages in a physical block is identified in a manner as shown in Reference 2 (JP-A-2007-323138).

SUMMARY

In the memory system as shown in Reference 1 (JP-A-2001-243110) or Reference 2 (JP-A-2007-323138), even if a certain logical block is often designated by access requests from the host system, identifying a physical block corresponding to the certain logical block is performed whenever an access request for the certain logical block is provided from the host system. In other words, conversion from the logical block number of the certain logical block to the physical block address of the physical block corresponding to the certain logical block is performed whenever the access request is provided from the host system. Further, when writing data to the physical block, it is necessary to identify the physical page having the smallest address among free physical pages in the physical block.

Therefore, if the above mentioned processes for identifying the physical block and the physical page can be efficiently performed for logical blocks often designated by access requests, efficiency of access to the flash memory can be improved.

Thus, the present invention is intended to efficiently perform access to a physical block corresponding to a logical block often designated by access requests from the host system.

According to the first aspect, a memory controller for controlling access to one or more flash memories, in which data erasing is performed in physical blocks and data writing is performed in physical pages, based on an access request from a host system, comprises:

a block management unit which manages information relating to a relationship between logical blocks each composed of plural logical sectors and physical blocks;

a physical page identifying unit which identifies a physical page having the smallest page number among free pages in a physical block or a physical page having the largest page number among physical pages storing data in a physical block;

a logical block information holding unit which holds a predetermined number of pieces of logical block information each of which is information, relating to a logical block, including information for identifying a physical block corresponding to the logical block and a physical page having the smallest page number among free pages in the physical block;

a priority order management unit which manages priority order about the predetermined number of the pieces of logical block information;

a logical block identifying unit which identifies a logical block including a logical sector designated by the access request;

a control unit which controls access to a physical block corresponding to the logical block identified by the logical block identifying unit, by referring to the logical block information.

When the logical block identifying unit identifies a logical block, the priority order management unit gives the highest priority to a first piece of logical block information which is a piece of logical block information corresponding to the identified logical block, and the logical block information holding unit holds the first piece of logical block information instead of a piece of logical block information having the lowest priority when not holding the first piece of logical block information.

According to the second aspect, a memory controller for controlling access to one or more flash memories, in which data erasing is performed in physical blocks and data writing is performed in physical pages, based on an access request from a host system, comprises:

a virtual block forming unit which forms virtual blocks each composed of plural physical blocks;

a block management unit which manages information relating to a relationship between logical blocks each composed of plural logical sectors and a virtual blocks;

a physical page identifying unit which identifies a virtual page having the smallest page number among free virtual pages in a virtual block or a virtual page having the largest page number among virtual pages storing data in a virtual block;

a logical block information holding unit which holds a predetermined number of pieces of logical block information each of which is information, relating to a logical block, including information for identifying a virtual block corresponding to the logical block and a virtual page having the smallest page number among free virtual pages in the virtual block;

a priority order management unit which manages priority order about the predetermined number of the pieces of logical block information;

a logical block identifying unit which identifies a logical block including a logical sector designated by the access request;

a control unit which controls access to a virtual block corresponding to the logical block identified by the logical block identifying unit, by referring to the logical block information.

When the logical block identifying unit identifies a logical block, the priority order management unit gives the highest priority to a first piece of logical block information which is a piece of logical block information corresponding to the identified logical block, and the logical block information holding unit holds the first piece of logical block information instead of a piece of logical block information having the lowest priority when not holding the first piece of logical block information.

According to the third aspect, a flash memory system comprises:

the memory controller according to the first aspect; and
one or more flash memories to which access is controlled by the memory controller.

According to the forth aspect, a flash memory system comprises:

the memory controller according to the second aspect; and
one or more flash memories to which access is controlled by the memory controller.

According to the fifth aspect, a method for controlling access to one or more flash memories, in which data erasing is performed in physical blocks and data writing is performed in physical pages, based on an access request from a host system, comprises:

a block management step managing information relating to a relationship between logical blocks each composed of plural logical sectors and physical blocks;

a physical page identifying step identifying a physical page having the smallest page number among free pages in a physical block or a physical page having the largest page number among physical pages storing data in a physical block;

a logical block information holding step holding a predetermined number of pieces of logical block information each of which is information, relating to a logical block, including information for identifying a physical block corresponding to the logical block and a physical page having the smallest page number among free pages in the physical block;

a priority order management step managing priority order about the predetermined number of the pieces of logical block information;

a logical block identifying step identifying a logical block including a logical sector designated by the access request;

a control step controlling access to a physical block corresponding to the logical block identified at the logical block identifying step, by referring to the logical block information.

Wherein when a logical block is identified at the logical block identifying step, the highest priority is given, at the priority order management step, to a first piece of logical block information which is a piece of logical block information corresponding to the identified logical block, and the first piece of logical block information is held, at the logical block information holding step, instead of a piece of logical block information having the lowest priority when not holding the first piece of logical block information.

According to the sixth aspect, a method for controlling access to one or more flash memories, in which data erasing is performed in physical blocks and data writing is performed in physical pages, based on an access request from a host system, comprises:

a virtual block forming step forming virtual blocks each composed of plural physical blocks;

a block management step managing information relating to a relationship between logical blocks each composed of plural logical sectors and a virtual blocks;

a physical page identifying step identifying a virtual page having the smallest page number among free virtual pages in a virtual block or a virtual page having the largest page number among virtual pages storing data in a virtual block;

a logical block information holding step holding a predetermined number of pieces of logical block information each of which is information, relating to a logical block, including information for identifying a virtual block corresponding to the logical block and a virtual page having the smallest page number among free virtual pages in the virtual block;

a priority order management step managing priority order about the predetermined number of the pieces of logical block information;

a logical block identifying step identifying a logical block including a logical sector designated by the access request;

a control step controlling access to a virtual block corresponding to the logical block identified at the logical block identifying step, by referring to the logical block information.

Wherein when a logical block is identified at the logical block identifying step, the highest priority is given, at the priority order management step, to a first piece of logical block information which is a piece of logical block information corresponding to the identified logical block, and the first piece of logical block information is held, at the logical block information holding step, instead of a piece of logical block information having the lowest priority when not holding the first piece of logical block information.

According to the present invention, information for access to physical blocks corresponding to logical blocks, until then, each designated by an access request is held. Therefore, access to a physical block corresponding to a logical block often designated by an access request is efficiently performed.

DETAILED DESCRIPTION OF THE EMBODIMENT

Figure 1:
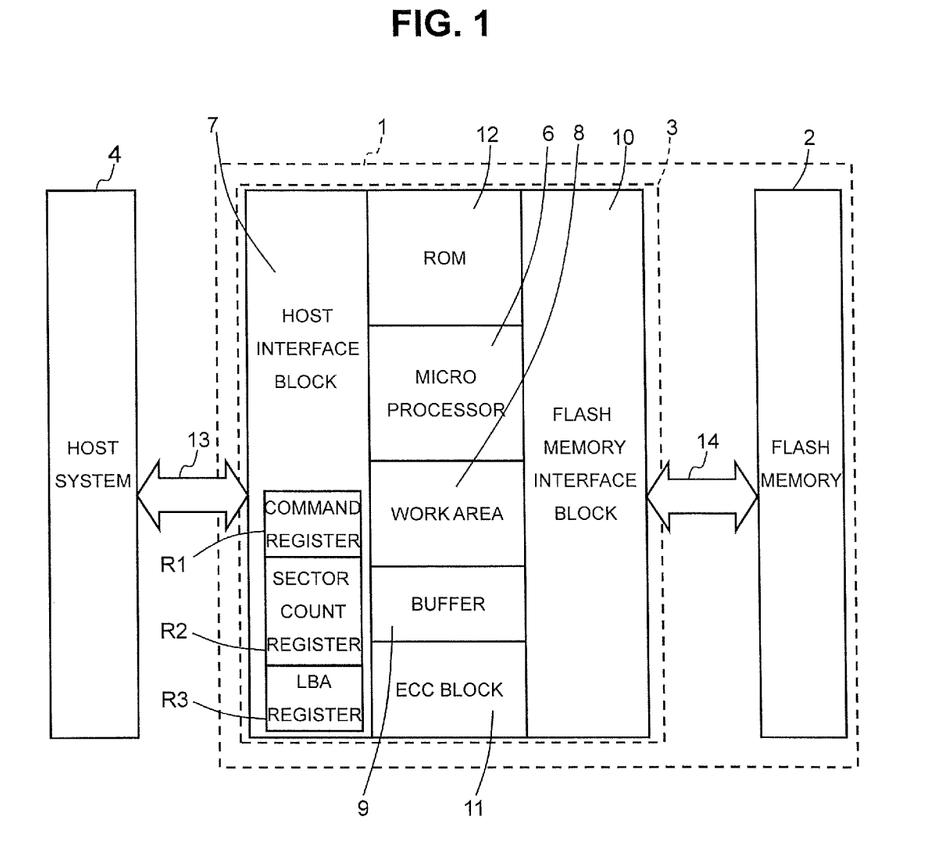
FIG. 1 is a block diagram depicting one embodiment of a flash memory system.

FIG. 1 is a block diagram schematically showing the structure of a flash memory system 1 as specific embodiment of the present invention.

As shown in FIG. 1, the flash memory system 1 is composed of a flash memory 2 and a memory controller 3 to control the flash memory 2. The memory controller 3 is connected through an internal bus 14 to the flash memory 2.

The flash memory system 1 is connected through an external bus 13 to a host system 4. The host system 4 is composed of a CPU (Central Processing Unit), a companion (peripheral) chip and so on. The CPU controls behavior of the host system 4. The companion (peripheral) chip sends or receives information to or from the memory system 1. The host system 4 may be a personal computer processing various information, such as character information, audio information, image information and so on, or various types of information processing equipment, such as a digital camera.

As shown in FIG. 1, the memory controller 3 comprises a microprocessor 6, a host interface block 7, a SRAM (Static Random Access Memory) 8, a buffer memory 9, a flash memory interface block 10, an ECC block 11, and a ROM (Read Only Memory) 12. These functional blocks composing the memory controller 3 are integrated into one chip. Next, each functional block will be described in detail.

The host interface block 7 receives data, address information, external commands, and so on from the host system 4, and Also sends data, status information, and so on to the host system 4. That is, the flash memory system 1 captures them provided from the host system 4 through the host interface block 7, and also provided them to the host system 4 through the host interface block 7. The external command is for the host system 4 to control the memory controller 3.

The host interface block 7 is provided with a command register R1, a sector count register R2, and a LBA register R3. The host system 4 writes a command code of an external command, such as write command or read command, to the command register R1, writes the number of sectors of data to be written or to be read to the sector count register R2, and writes a LBA (Logical Block Address) corresponding to the first logical sector, from which data writing or data reading starts, to the LBA register R3. The LBA is an address assigned to a logical sector having a capacity of 1 sector (512 bytes).

The SRAM (Static Random Access Memory) 8 is a volatile memory for temporarily holding information required for controlling the flash memory 2. Various tables required for accessing to the flash memory 2 are held in the SRAM 8, and are updated on the SRAM 8. In a case where a table for accessing to the flash memory 2 is not held in the SRAM 8, it is made up on the SRAM 8. However, in a case where it is stored in the flash memory 2, it is read from the flash memory 2 and then is held in the SRAM 8. The various tables include an address translation table, a search table, a defective block table and so on. The address translation table is to manage the relationship between logical block composed of plural logical sectors and a physical block. The search table is to search a free physical block, which is in erased state or stores only ineffective data. The defective block table is to manage defective physical blocks.

Incidentally, in the present invention, information relating to a physical blocks corresponding to logical blocks designated by a recent access request from the host system 4.

The buffer memory 9 is a volatile memory for temporarily holding data to be written to flash memory 2, or data read from the flash memory 2.

The flash memory interface block 10 controls sending data, address information, internal commands and so on to the flash memory 2, and also controls receiving data, status information and so on from the flash memory 2. The internal commands are for the memory controller 3 to control the flash memory 2, so the flash memory 2 works according to the internal command.

The ECC block 11 generates an ECC (Error Correcting Code) for data to be written to the flash memory 2. Data are stored together with its ECC in the flash memory 2. Further, the ECC block 11 detects and corrects bit errors in data read from the flash memory 2 on a basis of its ECC.

The ROM 12 is a nonvolatile memory, and stores firmware required for controlling the flash memory 2. Incidentally, only minimum firmware required for booting the flash memory system 1 may be stored in the ROM 12 and the other firmware may be stored in the flash memory 2.

A microprocessor 6 reads in the firmware from the ROM 12 or the flash memory 2, and works according to the firmware. Functional blocks included in the memory controller 3 are controlled by the microprocessor 6.

The flash memory 2 is NAND type flash memory, and comprises a register and a memory cell array composed of a plurality of memory cells arranged in a matrix. The memory cell array comprises a plurality of memory cell strings and a plurality of word lines. The memory cell strings are each composed of a plurality of memory cells connected in series. The word lines are used to select a memory cell from the each memory cell string. In data writing (programming), data retained in the register are stored in the memory cells selected by using the word lines. In data reading, data read from the memory cells selected by using the word lines are retained in the register. Incidentally, in common NAND type flash memories, there are flash memories composed of memory cells of SLC (Single Level Cell) type and flash memories composed of memory cells of MLC (Multi Level Cell) type.

In a NAND type flash memory, data reading and data writing are performed in pages (physical pages), and data erasing is performed in blocks (physical blocks). Each physical block is composed of plural physical pages, and each physical page comprises a user area and a redundant area. For example, a physical page comprises a user area having a capacity of 4 sectors (2048 bytes) and a redundant area having a capacity of 64 bytes, and a physical block comprises 64 physical pages. The user area stores data provided from the host system 4, and is treated as comprising plural of sector areas each having a capacity of 1 sector (512 bytes). The redundant area stores additional data, to which data stored in a user area pertains, such as an ECC (Error Correcting Code), logical address information, or a block status (flag).

The logical address information is information for identifying a logical block corresponding to a physical block with it. The block status is a flag for indicating whether or not a physical block with it is a defective physical block, which is not able to normally perform data writing (programming) and so on. Incidentally, among defective blocks, there are an initial defective block and a running defective block. The initial defective block is a defective block detected before the flash memory is shipped out of the factory. The running defective block is a defective block generated in use. A block status indicating the initial defective block is written before shipping. In flash memories of some manufacturers, a block status indicating the initial defective block is written to a user area. A criterion to determine whether or not a physical block is the running defective block is a matter of design.

In an write request for data writing from the host system 4 to the flash memory system 1, the host system 4 writes a command code of a write command to the command register R1, writes information indicating the number of sectors of write data to the sector count register R2, and writes information indicating a LBA corresponding to the first logical sector, from which data writing starts, to the LBA register R3. The memory controller 3 identifies logical sectors corresponding to the write data on a basis of information held in the sector count register R2 and the LBA register R3, and also identifies a logical block including the identified logical sectors.

Address space in the host system 4 is managed in logical sectors. Each of the logical sectors is an area of 1 sector (512 bytes). Each LBA (logical block address), which is a serial number, is assigned to each of the logical sectors. Also, plural logical blocks each composed of plural logical sectors are formed, and each of the logical blocks is assigned to one or more physical blocks.

In data writing for writing data, provided from the host system 4, to the flash memory 2 according to the write request, data writing starts from the physical page having the smallest page number among free physical pages, each of which stores no data, in the physical block corresponding to the identified logical block. In the data writing, physical pages store data provided from the host system 4 in ascending order of their page numbers.

Therefore, even if the logical block including logical sectors designated by the write request from the host system 4 is identified, data writing to the flash memory 2 can not execute without having to complete identifying a physical block corresponding to the logical block and identifying the physical page having the smallest page number among free physical page in the physical block.

Figure 2:
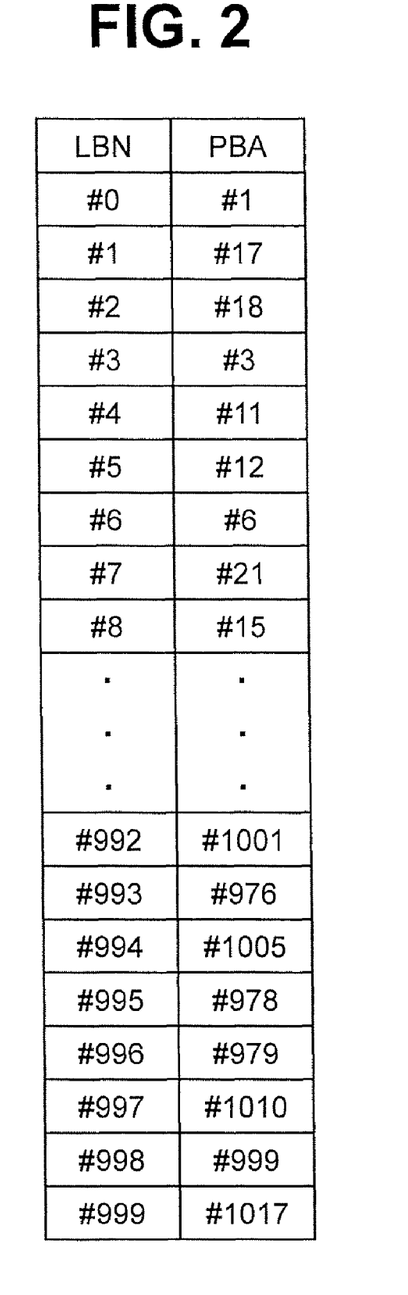
FIG. 2 shows an address translation table.

A physical block corresponding to a logical block identified on a basis of a write request is identified by referring to the address translation table as shown in FIG. 2. The address translation table is a table for managing the relationship between logical blocks and physical blocks. The address translation table of FIG. 2 indicates the relationship between a logical block number assigned to a logical block and a physical block address of a physical block.

The relationship is generally managed in zones. That is, plural logical zones each composed of plural logical blocks are formed, and address translation tables are made up and updated in the logical zones.

In general, the address translation tables are made up and updated on the SRAM 8. The address translation tables can be made up on a basis of logical address information stored in a redundant area. Incidentally, the made up address translation table may be saved in the flash memory 2, and when it is required, it may be read from the flash memory 2.

Figure 3:
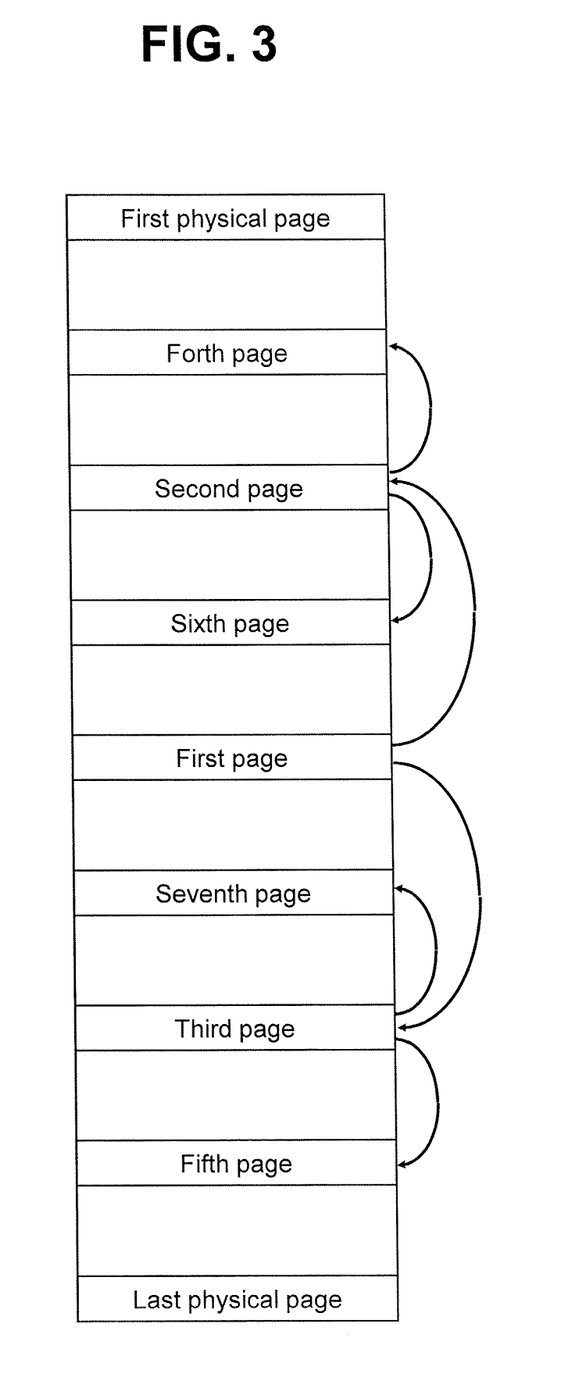
FIG. 3 shows a process for searching a physical page having the smallest page number among free physical page in a certain physical block.

Also, the physical page having the smallest page number among free physical page in the physical block is identified by reading information, stored in a redundant area of a physical page, indicating whether or not a physical page is free. This process can be performed efficiently by applying a binary search tree. For example, this process is performed in a manner as shown in FIG. 3. In the first step, information is read from a redundant area of a first page being in the center between the first physical page and the last physical page. In the second step, in a case where the read information in the first step is information indicating that a physical page is free, information is read from a redundant area of a second page being in the center between the first physical page and the first page, in contrast, in a case where the read information in the first step is information indicating that a physical page is not free, information is read from a redundant area of a third page being in the center between the last physical page and the first page. In the third step, a physical page from which information is read is determined on a basis of information read in the first step and the second step. In a case where information read in the first step is information indicating that a physical page is free and information read in the second step is information indicating that a physical page is free, information is read from a redundant area of a fourth page being in the center between the first physical page and the second page. In a case where information read in the first step is information indicating that a physical page is not free and information read in the second step is information indicating that a physical page is not free, information is read from a redundant area of a fifth page being in the center between the last physical page and the third page. In a case where information read in the first step is information indicating that a physical page is free and information read in the second step is information indicating that a physical page is not free, information is read from a redundant area of a sixth page being in the center between the first page and the second page. In a case where information read in the first step is information indicating that a physical page is not free and information read in the second step is information indicating that a physical page is free, information is read from a redundant area of a seventh page being in the center between the first page and the third page. This process goes on similarly, and then the physical page having the smallest page number among free physical page is finally identified.

Incidentally, the physical page having the smallest page number among free physical page is the physical page next to the physical page having the largest page number among physical blocks storing data. Therefore, after identifying the physical page having the largest page, data writing may be executed from a physical page next to the identified physical page. Also, a physical page having the largest page number among physical blocks storing data can be identified in the same manner as a physical page having the smallest page number among free physical page is identified.

In a case where a logical block to which some of logical sectors identified on a basis of information held in the sector count register R2 and the LBA register R3 is different from a logical block to which the other of the logical sectors, data writing or data reading is performed in logical blocks. For example, some of logical sectors designated by a request for data writing belongs to a first logical block and the other of the logical sectors belongs to a second logical block, data writing to a physical block corresponding to the first logical block and data writing to a physical block corresponding to the second logical block are performed separately. The physical block corresponding to the first logical block stores data corresponding to logical sectors belonging to the first logical block and the physical block corresponding to the second logical block stores data corresponding to logical sectors belonging to the second logical block.

In this embodiment, the memory controller 3 is configured so as to be able to hold 32 pieces of logical block information relating to logical blocks designated by access requests from host system 4. The logical block information include a logical block number (LBN) utilized for identifying a logical block designated by an access request, a physical block address (PBA) utilized for identifying a physical block corresponding to the logical block, and a page number (PN) utilized for identifying a physical page having the largest page number among physical pages storing data in the physical block.

Figure 4:
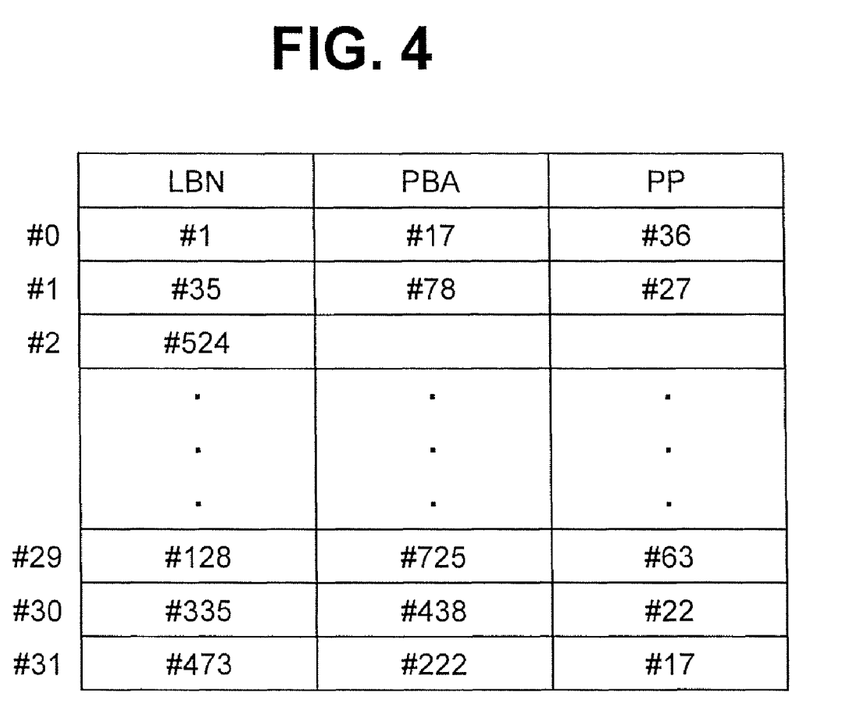
FIG. 4 shows entries for holding logical block information.

FIG. 4 shows 32 entries of entry number #0 to #31 for holding the logical block information. In each entry, a logical block number (LBN), a physical block number (PBN) and a page number (PN) are held. For example, in the entry of the entry number #0, #1 as a logical block number, #17 as a physical block address, and #36 as a page number are held. Therefore, it is found that the logical block of LBN #1 corresponds to the physical block of PBA #17 and the physical page having the largest page number among physical blocks storing data in the physical block of PBA #17. In the entry of the entry number #2, #524 as a logical block number is held, but no information as a physical block number (PBN) and a page number (PN) is held. Therefore, it is found that there is not a physical block corresponding to a logical block of LBN #524.

In holding logical block information, logical block information corresponding to a logical block designated by recent access request precedes. That is, when an access request is provided from the host system 4, priority of a piece of logical block information corresponding to a logical block designated by the access request becomes the highest. When a piece of logical block information is newly held, the piece of logical block information having the lowest priority among 32 pieces of logical block information, is replaced with the piece of logical block information which is newly held. This management of priority order will be described by referring to FIG. 5.

Figure 5:
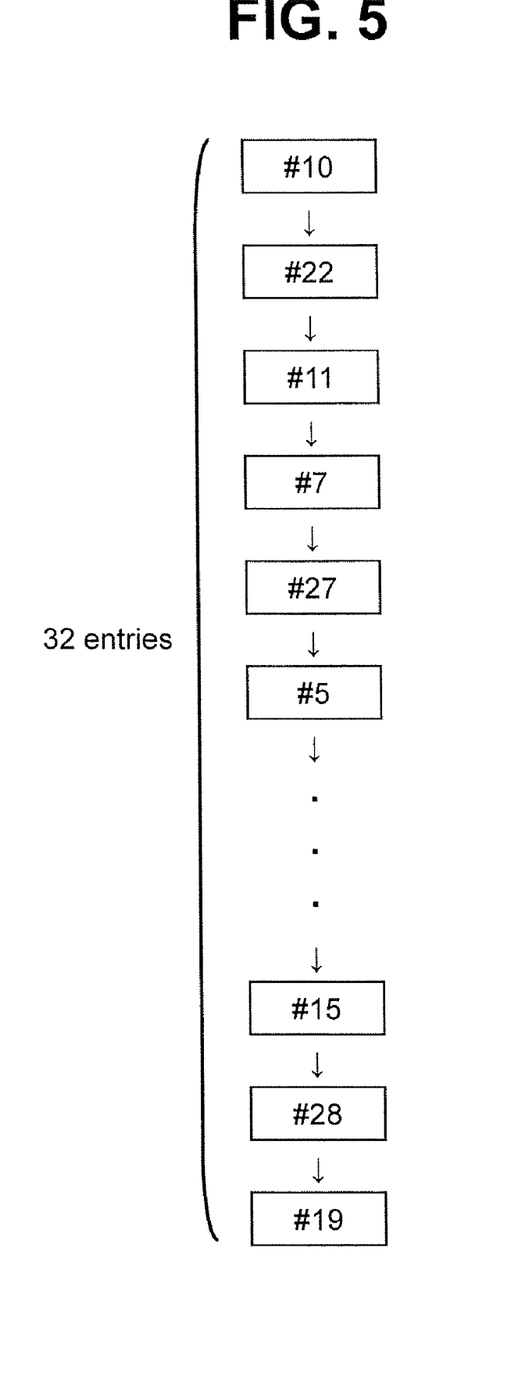
FIG. 5 shows priority order of entries.
Figure 6:
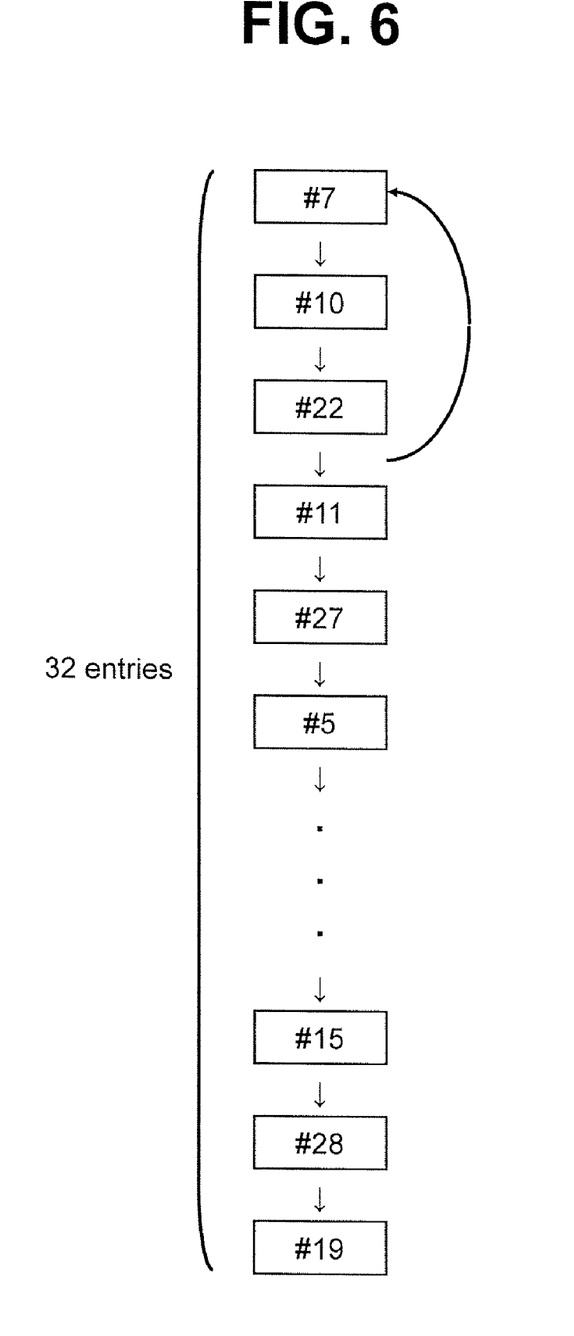
FIG. 6 shows priority order of entries.
Figure 7:
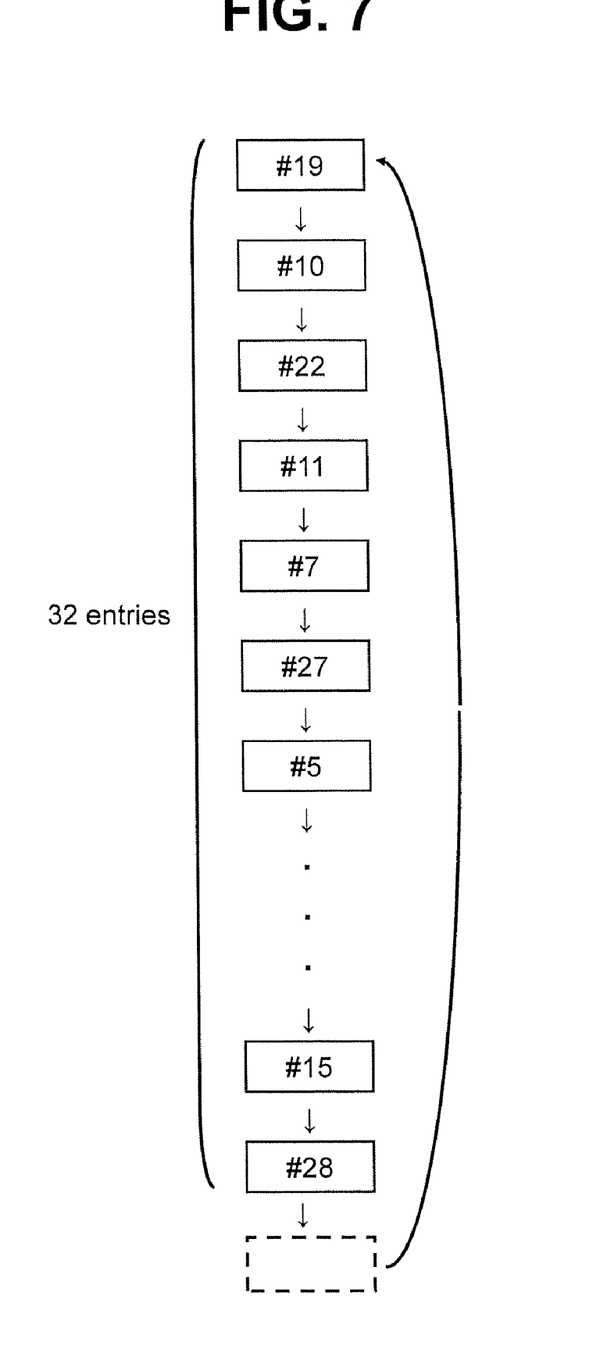
FIG. 7 shows priority order of entries.

In this embodiment, priority order for 32 pieces of logical block information is managed by managing priority order for 32 entries holding the 32 pieces of logical block information. In FIG. 5, priority order relating to 32 pieces of logical block information is shown, and entry numbers of the 32 pieces of logical block information are placed in priority order from the highest to the lowest. In FIG. 5, priority of entry of entry number #10 is the highest, priority of entry of entry number #22 is the second highest, and priority of entry of entry number #19 is the lowest, The priority order changes on a basis of an access request from the host system 4. When an access request is provided from the host system 4, it is determined whether or not any one of the 32 entries holds logical block information corresponding to a logical block designated by the access request (a logical block including in logical sectors designated by the access request). In a case where an entry holds the logical block information corresponding to the designated logical block, priority order is changed so that priority of the entry becomes the highest. For example, if the entry holding the logical block information is an entry of entry number #7, priority order is changed priority of an entry of entry number #7 becomes the highest. That is, as shown in FIG. 6, priority of an entry of entry number #7 becomes the highest, and priority of an entry of entry number #10 becomes the second highest. Also, priority of an entry of entry number #10 becomes lower priority by one level than priority of an entry of entry number #22. In a case where no entry holds the logical block information corresponding to the designated logical block, the logical block information corresponding to the designated logical block is written to an entry having the lowest priority and priority order is changed so that priority of the entry, until then, having the lowest priority becomes the highest. That is, as shown in FIG. 7, priority of an entry of entry number #19 becomes the highest, and priority of an entry of entry number #10 becomes the second highest. Also, priority of an entry of entry number #28 becomes the lowest.

By managing priority order as described above, logical block information corresponding to a logical block often designated by an access request from the host system 4 tends to keep on being held in an entry. Therefore, in almost all of access requests relating to a logical block often designated by an access request, a physical block corresponding to the designated logical block and a physical page having the smallest page number among free physical pages in the physical block can be identified on a basis of logical block information held in an entry.

Next, behavior of the memory controller 3 in response to an access request will be described. When receiving an access request, the memory controller 3 determines whether or not logical block information corresponding to a logical block designated by the access request is held in an entry by referring to entries. As a result, in a case where it is determined that the logical block information corresponding to the designated logical block is held in an entry, the physical block corresponding to the designated logical block and the physical page having the smallest page number among free physical pages in the physical block are identified on a basis of the logical block information held in the entry. In a case where it is determined that the logical block information corresponding to the designated logical block is not held in an entry, the physical block corresponding to the designated logical block is identified by referring to an address translation table, and also the physical page having the smallest page number among free physical pages in the physical block or a physical page having the largest page number among physical pages storing data in the physical block is identified by applying a binary search tree or another method. A logical block on a basis of information identified in this way is newly written to an entry having the lowest priority.

Next, the memory controller 3 accesses a physical block corresponding to a logical block designated by an access request, on a basis of logical block information held in an entry or logical block information newly written to an entry. In a case where an access request is for requesting data writing, data writing is executed in ascending order of page number, from physical page having the smallest page number among free physical blocks in the physical block. In a case where an access request is for requesting data erasing, data stored in the physical block are erased (the physical block is subjected to data erasing). In a case where an access request is for requesting data reading, a physical page corresponding to a logical page including logical sectors designated by an access request is identified, and then data are read from the identified physical page.

Figure 8:
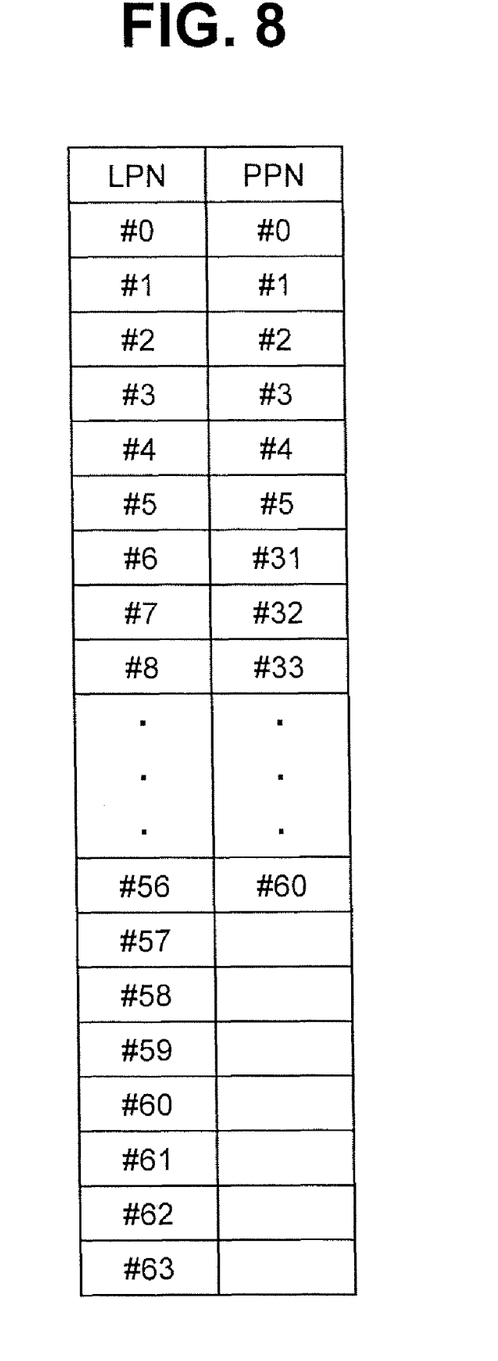
FIG. 8 shows a page table.

In a case where plural pages of data are stored in physical pages in a physical block not in order of a serial number assigned to a logical page, a physical page corresponding to a logical page including logical sectors designated by an access request may be identified by referring a page table indicating the relationship between logical pages and physical pages. FIG. 8 shows a page table by way of example. The page table indicates the relationship between a logical page number (LPN), which is a serial number assigned to a logical block, and a physical page number (PPN), which is a serial number assigned to a physical page. For example, by referring the page table, it is found that the logical page of LPN #0 corresponds to the physical page of PPN #0, the logical page of LPN #6 corresponds to the physical page of PPN #31, and the logical page of LPN #56 corresponds to the physical page of PPN #60

Also, when the memory controller 3 writing data to a physical block, also a page table relating to the physical block may be written to the physical block. For example, when the memory controller 3 writing data to a physical block, a page table may be written to a physical page next to a physical page storing the last data of the data. If the page table is written in this way, the page table is written to a physical page having the largest page number among physical pages having data, including data relating to a page table, in the physical block. Therefore, by reading a page table from a physical block corresponding to a logical block designated by an access request on a basis of logical block information, and referring to the page table, data reading from the physical block may be performed. Incidentally, in a case where plural pages of data are stored in physical pages in a physical block in order of a serial number assigned to a logical page, a page table may not be stored in the physical block. Therefore, logical block information includes information indicating whether or not storing a page table.

In a case where data writing or data erasing is performed in response to an access request from host system 4, logical block information is updated according to the access (the data writing or the data erasing). For example, a page number indicating a physical page having the largest page number among physical pages storing data in a physical block is changed in response to data writing or data erasing.

In foregoing specification, specific embodiments of the present invention have been described. However, the scope of the present invention is not limited to the embodiment. Of course, various modifications and changes can be made without departing from the scope of the present invention.

For example, in a case where a logical block is assigned to a virtual block composed of plural physical blocks and the relationship a logical block and the virtual block is managed, logical block information may include information for identifying a virtual block (for identifying physical blocks composing a virtual block). In addition, in a case where data writing is performed in virtual pages each of which composed of plural physical pages respectively belonging to plural physical blocks composing a virtual block, logical block information may include information for identifying a virtual page from which data writing starts.

Also, management of priority order for plural pieces of logical information may be performed in a different manner from the above as far as its object can be achieved.

What is claimed is:

1. A memory controller for controlling access to one or more flash memories, in which data erasing is performed in physical blocks and data writing is performed in physical pages, based on an access request from a host system, comprising:
   a block management unit which manages information relating to a relationship between logical blocks each composed of plural logical sectors and physical blocks;
   a physical page identifying unit which identifies a physical page having the smallest page number among free pages in a physical block or a physical page having the largest page number among physical pages storing data in a physical block;
   a logical block information holding unit which holds a predetermined number of pieces of logical block information each of which is information, relating to a logical block, including information for identifying a physical block corresponding to the logical block and a physical page having the smallest page number among free pages in the physical block;
   a priority order management unit which manages priority order about the predetermined number of the pieces of logical block information;
   a logical block identifying unit which identifies a logical block including a logical sector designated by the access request;
   a control unit which controls access to a physical block corresponding to the logical block identified by the logical block identifying unit, by referring to the logical block information;
   wherein when the logical block identifying unit identifies a logical block, the priority order management unit gives the highest priority to a first piece of logical block information which is a piece of logical block information corresponding to the identified logical block, and the logical block information holding unit holds the first piece of logical block information instead of a piece of logical block information having the lowest priority when not holding the first piece of logical block information.

2. A memory controller for controlling access to one or more flash memories, in which data erasing is performed in physical blocks and data writing is performed in physical pages, based on an access request from a host system, comprising:
   a virtual block forming unit which forms virtual blocks each composed of plural physical blocks;
   a block management unit which manages information relating to a relationship between logical blocks each composed of plural logical sectors and a virtual blocks;
   a physical page identifying unit which identifies a virtual page having the smallest page number among free virtual pages in a virtual block or a virtual page having the largest page number among virtual pages storing data in a virtual block;
   a logical block information holding unit which holds a predetermined number of pieces of logical block information each of which is information, relating to a logical block, including information for identifying a virtual block corresponding to the logical block and a virtual page having the smallest page number among free virtual pages in the virtual block;
   a priority order management unit which manages priority order about the predetermined number of the pieces of logical block information;
   a logical block identifying unit which identifies a logical block including a logical sector designated by the access request;
   a control unit which controls access to a virtual block corresponding to the logical block identified by the logical block identifying unit, by referring to the logical block information;
   wherein when the logical block identifying unit identifies a logical block, the priority order management unit gives the highest priority to a first piece of logical block information which is a piece of logical block information corresponding to the identified logical block, and the logical block information holding unit holds the first piece of logical block information instead of a piece of logical block information having the lowest priority when not holding the first piece of logical block information.

3. A flash memory system comprising:
   the memory controller according to claim 1; and
   one or more flash memories to which access is controlled by the memory controller.

4. A flash memory system comprising:
   the memory controller according to claim 2; and
   one or more flash memories to which access is controlled by the memory controller.

5. A method for controlling access to one or more flash memories, in which data erasing is performed in physical blocks and data writing is performed in physical pages, based on an access request from a host system, comprising:
   a block management step managing information relating to a relationship between logical blocks each composed of plural logical sectors and physical blocks;
   a physical page identifying step identifying a physical page having the smallest page number among free pages in a physical block or a physical page having the largest page number among physical pages storing data in a physical block;
   a logical block information holding step holding a predetermined number of pieces of logical block information each of which is information, relating to a logical block, including information for identifying a physical block corresponding to the logical block and a physical page having the smallest page number among free pages in the physical block;

a priority order management step managing priority order about the predetermined number of the pieces of logical block information;

a logical block identifying step identifying a logical block including a logical sector designated by the access request;

a control step controlling access to a physical block corresponding to the logical block identified at the logical block identifying step, by referring to the logical block information;

wherein when a logical block is identified at the logical block identifying step, the highest priority is given, at the priority order management step, to a first piece of logical block information which is a piece of logical block information corresponding to the identified logical block, and the first piece of logical block information is held, at the logical block information holding step, instead of a piece of logical block information having the lowest priority when not holding the first piece of logical block information.

6. A method for controlling access to one or more flash memories, in which data erasing is performed in physical blocks and data writing is performed in physical pages, based on an access request from a host system, comprising:

a virtual block forming step forming virtual blocks each composed of plural physical blocks;

a block management step managing information relating to a relationship between logical blocks each composed of plural logical sectors and a virtual blocks;

a physical page identifying step identifying a virtual page having the smallest page number among free virtual pages in a virtual block or a virtual page having the largest page number among virtual pages storing data in a virtual block;

a logical block information holding step holding a predetermined number of pieces of logical block information each of which is information, relating to a logical block, including information for identifying a virtual block corresponding to the logical block and a virtual page having the smallest page number among free virtual pages in the virtual block;

a priority order management step managing priority order about the predetermined number of the pieces of logical block information;

a logical block identifying step identifying a logical block including a logical sector designated by the access request;

a control step controlling access to a virtual block corresponding to the logical block identified at the logical block identifying step, by referring to the logical block information;

wherein when a logical block is identified at the logical block identifying step, the highest priority is given, at the priority order management step, to a first piece of logical block information which is a piece of logical block information corresponding to the identified logical block, and the first piece of logical block information is held, at the logical block information holding step, instead of a piece of logical block information having the lowest priority when not holding the first piece of logical block information.

* * * * *